Dec. 4, 1951    C. VINTEN ET AL    2,577,494
AUTOMATICALLY FOCUSSING CAMERA, WITH SPECIAL
REFERENCE TO CINEMA CAMERAS
Filed Aug. 1, 1947    2 SHEETS—SHEET 2
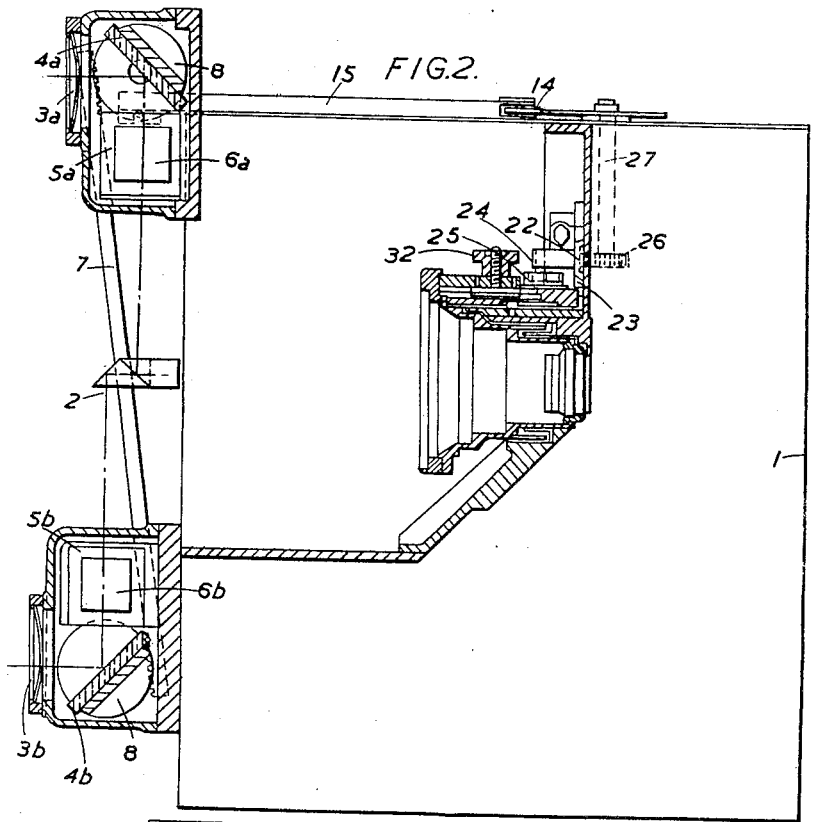
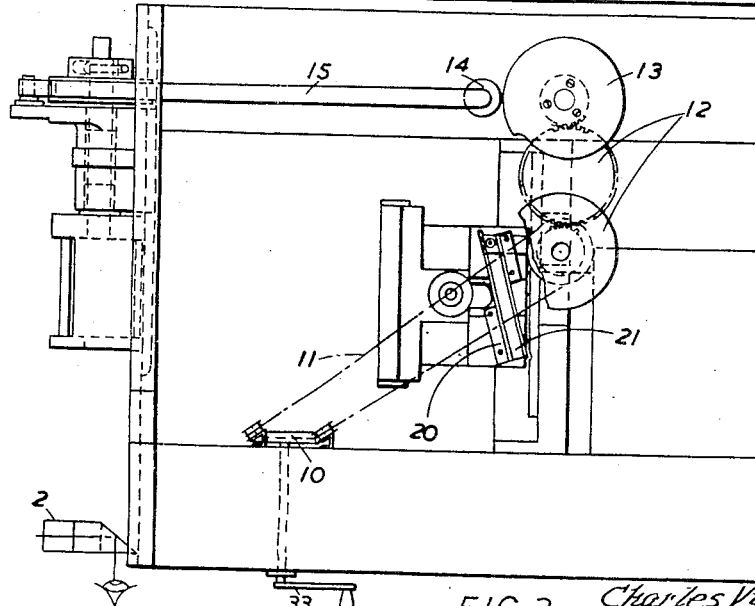
Inventors
Charles Vinten
Ivor J. Dunningham
Attorney Patented Dec. 4, 1951

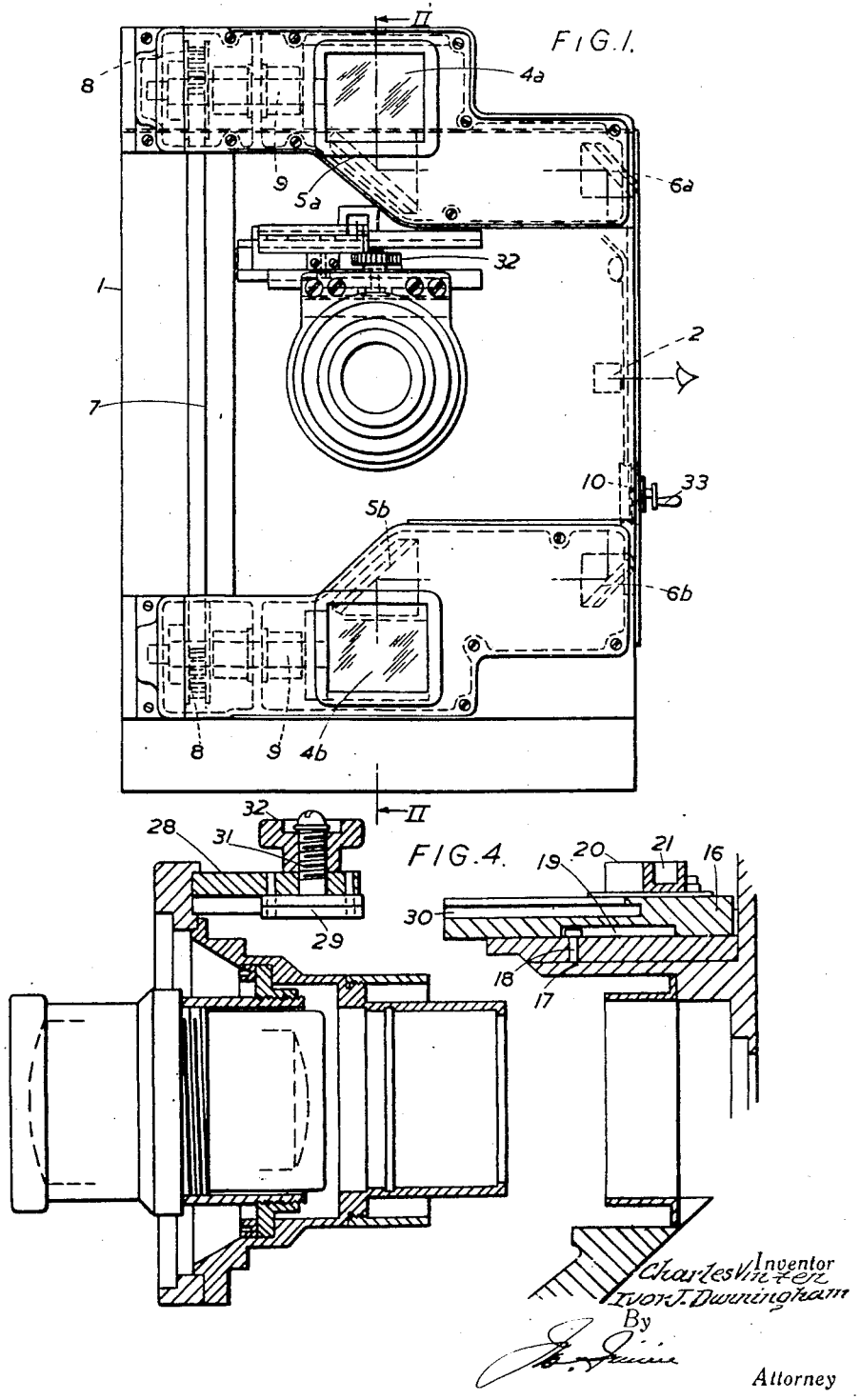

2,577,494

UNITED STATES PATENT OFFICE 2,577,494

AUTOMATICALLY FOCUSING CAMERA, WITH SPECIAL REFERENCE TO CINEMA CAMERAS

Charles Vinten and Ivor Joseph Dunningham, London, England

Application August 1, 1947, Serial No. 765,410
In Great Britain May 13, 1947

4 Claims. (Cl. 95—44)

The present invention relates to automatically focussing cameras, and has more particular, although not exclusive, reference to cinematograph cameras. In the use of the term "automatically focussing" there is envisaged an arrangement of the camera proper in combination with a rangefinder, the lens system of the former being mechanically coupled with adjustable members, such as reflectors, in the rangefinder in order to ensure that the rangefinder will be trained, and the camera lens system focussed, to the same range, and will vary simultaneously, and by corresponding amounts, as movement of the object under observation is followed.

The invention accordingly consists in a camera and rangefinder in combination, wherein the focussing means for the camera lens system are mechanically connected to, and thereby caused to follow adjustment of, the training mechanism of the rangefinder, whereby the camera is automatically focussed upon the subject on to which the rangefinder is trained.

In the art of photography it is frequently necessary to change the camera lens for another of different focal length, but if the lens mount or holder is coupled to a rangefinder mechanism for automatic focussing such as indicated above, the focussing adjustment means, if correct for a lens of one focal length, will in general be incorrect for a lens of a different focal length.

A further object of the present invention is to obviate this difficulty, and to provide an automatic focussing system which gives correct operation with any one of a range of lenses of various focal lengths, which may be fitted to the camera without interfering with the automatic focussing action of the system.

With this further object in view the invention consists in a camera and rangefinder in combination comprising camera focussing means, and rangefinder training mechanism mechanically interconnected in order to ensure that the camera will be focussed, and the rangefinder trained, to the same range at one operation, wherein the camera lens mount incorporates one or more parts of said mechanical interconnecting and adjusting means having characteristics determined by the focal length of the lens system embodied in the mount, and is interchangeable with a like lens mount embodying a lens system of different focal length, and a similar part or parts of said interconnecting and adjusting means having different characteristics corresponding to the different focal length of the lens system.

Each of the range of lenses provided for alternative fitment to the camera may be contained in a holder comprising two parts, relatively adjustable, and securable in different relative positions, within limits, allowing prefocussing of the lens, after fitment on the camera, independently of its connection to the rangefinder mechanism.

The invention will be clearly understood from the following description of one form which it may assume, and this description will be more readily followed by reference to the accompanying drawings wherein:

Figure 1 represents a front elevation,

Figure 2 is a side sectional elevation along the line II—II of Figure 1, and

Figure 3 is a plan view of an automatically focussing camera according to the invention, while Figure 4 represents a detail of the invention to a larger scale.

In carrying the invention into effect in one convenient manner, as shown in the drawings herewith, a rangefinder and camera are built together in or on a common casing or framework 1. The rangefinder system may comprise a viewfinder prism or reflector system 2 disposed midway along the base-line of a short-base rangefinder, at the ends of which are disposed the rangefinder objective lenses 3a, 3b, whose images are reflected by inclined mirrors or prisms 4a, 4b, 5a, 5b, 6a, 6b, to the viewfinder system 2. Each optical path includes a mirror or reflector 4a or 4b, rotatable about an axis perpendicular to the plane containing the optical axes of the lenses 3a and 3b, and these mirrors or reflectors are coupled together, for simultaneous rotation at equal rates, by a rack bar 7 extending between and making interconnecting engagement with pinions 8 on shafts 9 which carry the reflectors 4a, 4b and allow rotation thereof. A winding handle 33 on the side of the casing 1 carries a wheel 10 connected by an endless cord or chain 11 to a gear train 12 driving a rotary cam 13. The roller 14 of a connecting rod 15 rides against the cam 13 and at its other end is attached to the rotational mechanism of the reflector 4a. By suitable operation of the handle 33 an observer can thus rotate the reflectors 4a, 4b and thereby bring or maintain in coincidence the two images of an object received separately from the two reflectors 4a, 4b in the viewfinder 2. In accordance with the known principles of rangefinding the angle between the two reflectors 4a and 4b is a measure of, and can, if desired, be used to determine, the object thus observed in the viewfinder 2.

The camera lens system is arranged, according to the invention, to be adjusted by movement of the rangefinder system, in order that it shall be maintained in focus upon the object to which the rangefinder reflectors are trained. To this end the lens mount comprises a cylinder 16 (Figure 4) telescopically engaged on another cylinder 17 secured to or integral with the casing 1, and axially slidable thereon between limits determined by a fixed pin 18 which engages in an internal slot 19 of the cylinder 16. A platform formed on the upper side of the cylinder 16 carries a member 20 having a lateral cam groove or channel 21 slightly inclined to the plane perpendicular to the axis of the camera lens. The angle of inclination of the groove 21 depends upon the focal length of the lens system housed in the mount. A slide 22 (Figure 2) carried in a grooved member 23 on the casing 1 above the lens mount has a projecting arm 24 with a depending roller 25 engaging the cam groove or channel 21, while at the opposite face of the slide 22 is provided a rack engaged by a pinion 26 carried on the downwardly projecting spindle 27 of one of the wheels of the gear train 12. It will be clear, therefore, that as the rangefinder reflectors 4a, 4b are adjusted to keep in range with an object under observation, the slide 22 is moved laterally by pinion 26, thereby moving roller 25 along the inclined channel 21 and thus causing the cylinder 16 to move telescopically backwards or forwards on the cyinder 17.

The lens holder 28 (Figure 4) forming part of the lens mount, fits externally on the cylinder 16, having internally a flanged, T-sectioned member 29 adapted to engage a slot 30 in the platform on the cylinder 16, and a screw 31 with a milled-headed nut 32 is provided to clamp the lens holder to the cylinder 16 in any desired position. When so locked the lens holder 28 moves with the cylinder 16 and is thus kept in focus on the object to which the rangefinder is trained.

It will be noted that the lens holder 28 can be adjusted on the cylinder 16 in relation to the cam groove 21 by releasing the clamping means, 29, 31, 32, allowing proper initial focusing of the lens. It will also be noted that the lens unit, comprising the cylinder 16, cam groove member 20 thereon, and the lens mount 28, can be removed as a whole from the camera and replaced by a like unit embodying a lens system of different focal length and a cam groove member 29 with its groove at a correspondingly different inclination.

It should be understood that the invention is not restricted solely to the constructional details of the form described above, which may be modified, in order to carry the invention into effect under different conditions and requirements which have to be fulfilled, without departing from the scope of the invention.

What we claim is:

1. A cinematograph camera having a casing and an objective lens system, in combination with a rangefinder comprising two reflecting surfaces located forward of the camera objective at opposite ends of a rangefinder base line which is perpendicular to the optical axis of said objective, said reflecting surfaces being equispaced from said optical axis and both being rotatable, each about an axis perpendicular to the plane containing said base line and said optical axis, means for effecting simultaneous rotary adjustment of both said reflecting surfaces in opposite senses, means for moving said objective lens system to focussing position, mechanical means connecting said adjusting means and said lens moving means for simultaneous co-related operation, a viewing device mounted forward of said objective and viewable from the side of the camera, optical means for projecting into said viewing device images originating from both said reflecting surfaces, manually operable means mounted in the side wall of the said camera casing adjacent to said viewing device, and mechanical connecting means between said manually operable means and said reflecting surface adjusting means.

2. A cinematograph camera according to claim 1 wherein said two reflecting surfaces are located one above and one below the level of said viewing device located at the side of the camera.

3. A cinematograph camera and rangefinder in combination comprising a casing having an adjustable camera objective and focussing means therefor, an eyepiece perpendicular to the optical axis of the objective, a pair of rangefinding housings each having a lens, a pair of rotatably adjustable mirrors in the housings spaced equidistant from the eyepiece with their rotational axes located in a plane perpendicular to the optical axis, a rock-shaft and pinion for each mirror and a rack bar coacting with the pinions, a connecting rod for actuating one of said pinions and a friction roller journaled in the free end of the connecting rod, rotary power transmission mechanism mounted on the casing and including a cam for coaction with the roller, operative connections between the rotary power transmission mechanism and the focusing means, and manually controlled driving mechanism mounted on the casing for activating the rotary power transmission mechanism.

4. A cinematograph camera and rangefinder in combination comprising a casing having an adjustable objective, an eyepiece located in a plane perpendicular to the optical axis of the objective, a pair of range-finding housings mounted on the casing, a pair of rotatably adjustable mirrors mounted in the housings with their rotational axes in a plane perpendicular to the optical axis and spaced equidistant from the eyepiece, means for simultaneously adjusting the mirrors, a support for the objective fixed in the casing, a slidable guide-plate mounted on the support, means for clamping the objective to the guide-plate, a diagonally arranged cam-plate mounted on the slide-plate, rotary power transmission mechanism mounted adjacent the objective and means actuated thereby for activating the adjusting means of the mirrors, manually operated driving means for the rotary power transmission mechanism, a slide-rack mounted on the casing for movement transversely of the objective, a friction roller journaled on the slide-rack for coaction with the cam-plate, and operative connections between the slide-rack and the rotary power transmission mechanism.

CHARLES VINTEN.
IVOR JOSEPH DUNNINGHAM.

REFERENCES CITED

The following references are of record in the file of this patent:

UNITED STATES PATENTS

| Number | Name | Date |
|---|---|---|
| 1,240,788 | Becker | Sept. 18, 1917 |
| 1,777,257 | Debrie | Sept. 30, 1930 |
| 1,927,884 | Barenyi | Sept. 26, 1933 |

(Other references on following page)

UNITED STATES PATENTS

| Number | Name | Date |
|---|---|---|
| 1,930,432 | Barnack | Oct. 10, 1933 |
| 1,993,463 | Thorner | Mar. 5, 1935 |
| 2,037,513 | Kuppenbender | Apr. 14, 1936 |
| 2,106,622 | Pritschow et al. | Jan. 25, 1938 |
| 2,151,124 | Letiz | Mar. 21, 1939 |
| 2,153,813 | Pritschow | Apr. 11, 1939 |
| 2,164,695 | Brink et al. | July 4, 1939 |
| 2,193,038 | Mihalyi | Mar. 12, 1940 |
| 2,202,593 | Moreau et al. | May 28, 1940 |
| 2,203,368 | Settel et al. | June 4, 1940 |
| 2,265,896 | Dalotel | Dec. 9, 1941 |
| 2,305,437 | Meyers et al. | Dec. 15, 1942 |
| 2,342,876 | McWilliams | Feb. 29, 1944 |
| 2,353,227 | Drotning | July 11, 1944 |

FOREIGN PATENTS

| Number | Country | Date |
|---|---|---|
| 657,348 | Germany | Mar. 2, 1938 |
| 703,215 | Germany | Mar. 4, 1941 |
| 703,827 | Germany | Mar. 17, 1941 |